Oct. 12, 1948.  F. T. SMITH  2,451,124
BEARING FOR ELECTRIC MOTORS
Filed July 10, 1944

INVENTOR
Floyd T. Smith
BY
William P. Stewart
ATTORNEY

Patented Oct. 12, 1948

2,451,124

UNITED STATES PATENT OFFICE 2,451,124

BEARING FOR ELECTRIC MOTORS

Floyd T. Smith, Plainfield, N. J., assignor to The Singer Manufacturing Company, Elizabeth, N. J., a corporation of New Jersey Application July 10, 1944, Serial No. 544,259

1 Claim. (Cl. 308—77)

This invention relates to bearings and particularly to bearings for electric motors required to be used over a wide range of temperature variations.

An electric motor adapted to be used in an airplane is a good example of one which is required to function under extreme changes in temperature. When the plane is on the ground, the temperature may well be in the neighborhood of +110° F., while within a relatively short period of time it may be flying at a high altitude in a temperature as low as —58° F.; a temperature change of 168° F.

In the higher altitudes, where the temperature is low, the lubricant in the bearings of an electric motor becomes stiff and the parts bind because of the unequal contraction of the metals of which the parts of the motor and the bearings are constructed. Thus a bearing which is suitable and satisfactory for normal operating temperatures may, in extremely low temperatures, develop friction so great as to prevent running of the motor.

It is an object of this invention to provide an improved bearing for electric motors adapted for use in aircraft and which will function satisfactorily in all temperatures to which such devices are subjected.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
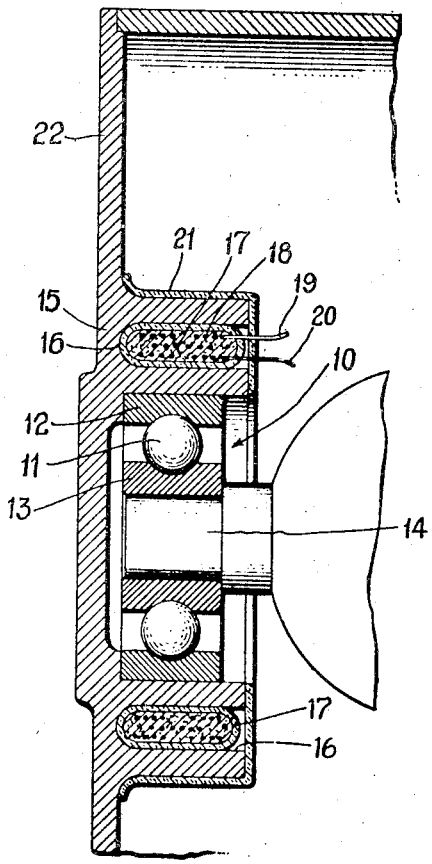
Fig. 1 is a vertical section through an electric motor bearing embodying this invention.

Referring more specifically to the drawing, there is shown a ball bearing 10, of any suitable type, having balls 11, an outer ball race 12 and an inner ball race 13. Within the inner race 13 is mounted the shaft 14 of a motor rotor. The bearing is supported by a hub 15 formed on the end cover 22 of the motor. This hub has an annular open sided recess 16 surrounding the bearing and adapted to have inserted laterally therein a unitary ring-like heating element.

Figure 2:
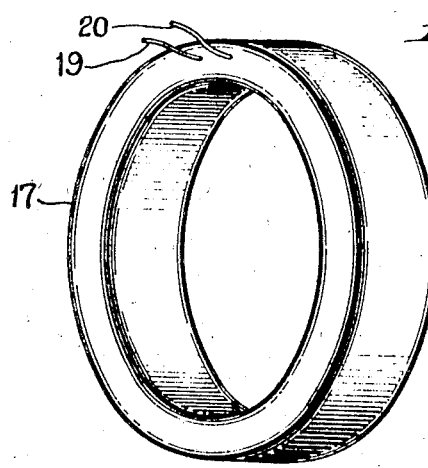
Fig. 2 is a perspective view of a heating unit constructed according to this invention.

In Fig. 2 is shown a heating element 17 composed of coils 18 of resistance wire (Fig. 1) set in an electrical insulating medium such, for example, as porcelain or any other suitable material. The insulated lead-in wires for the coils 18 are shown at 19 and 20.

About the hub 15 there is removably secured an annular cup-like cover 21 of heat insulating material, which may serve not only to prevent heat loss, but to retain the heating element in position. The efficiency of this device is high, very little heat being lost through the member 22.

The invention is applicable to bearings in general, whether of ball, roller, or babbit type, and maintains the bearings in free condition at all temperatures with very slight consumption of current. The current, which is supplied to the heating unit from any suitable source through leads 19 and 20, may be controlled by hand or by an automatic control of usual construction, to increase or to reduce the temperature of the unit as the temperature of the surrounding air falls or rises.

These units may be installed in the hubs of existing motors by making in them annular grooves of size to receive the units, or in cases where efficiency is no object, by attaching them exteriorly in a position such that the hub and bearing are warmed by them.

It is to be understood that the bearing at the opposite end of the motor shaft may be constructed similarly to the one above described and illustrated in the drawings.

As many apparently widely different embodiments of this invention may be made without departing from the spirit and scope thereof, it is to be understood that I do not limit myself to the specific embodiments thereof except as defined in the appended claim.

Having thus set forth the nature of the invention, what I claim herein is:

A bearing assembly comprising a shaft, a bearing for the shaft, a support for the bearing having a hub provided with an open-sided annular recess extending about the bearing, a unitary annular heating element secured in said recess for lateral removal and comprising a heating coil set in electrical insulation, means to supply current to said heating element, and means to retain said heating element in said recess and to prevent the loss of heat, comprising a removable cup-like heat insulating shield covering said hub and closing the open side of said annular recess.

FLOYD T. SMITH.

REFERENCES CITED

The following references are of record in the file of this patent:

UNITED STATES PATENTS

| Number | Name | Date |
| --- | --- | --- |
| 423,580 | Warrington | Mar. 18, 1890 |
| 1,645,366 | Alexander | Oct. 11, 1927 |
| 2,281,971 | Goddard | May 5, 1942 |
| 2,352,206 | Kendall | June 27, 1944 |

FOREIGN PATENTS

| Number | Country | Date |
| --- | --- | --- |
| 598,040 | Germany | June 5, 1934 |